July 1, 1952 C. E. LOMAX 2,602,121

CONNECTOR CIRCUIT EMPLOYING A SEQUENCE SWITCH

Filed May 16, 1950 2 SHEETS—SHEET 1

INVENTOR.
CLARENCE E. LOMAX

BY

[signature]

ATTORNEY

July 1, 1952 C. E. LOMAX 2,602,121

CONNECTOR CIRCUIT EMPLOYING A SEQUENCE SWITCH

Filed May 16, 1950 2 SHEETS--SHEET 2

INVENTOR.
CLARENCE E. LOMAX

BY

ATTORNEY

Patented July 1, 1952

2,602,121

UNITED STATES PATENT OFFICE 2,602,121

CONNECTOR CIRCUIT EMPLOYING A SEQUENCE SWITCH

Clarence E. Lomax, Chicago, Ill., assignor to Automatic Electric Laboratories, Inc., Chicago, Ill., a corporation of Delaware Application May 16, 1950, Serial No. 162,209

5 Claims. (Cl. 179—17)

Figure 1:
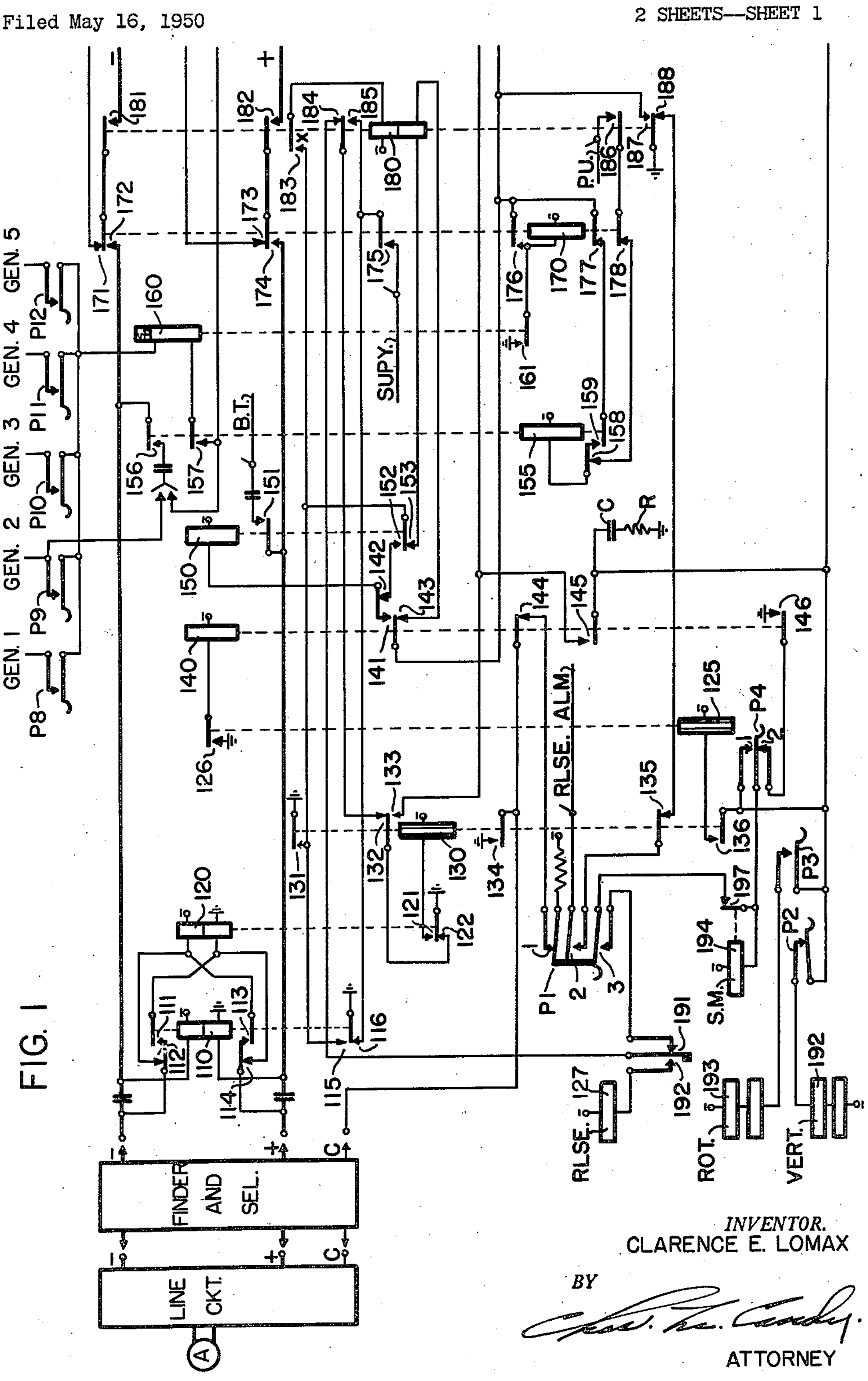

This invention relates in general to telephone systems and more particularly to telephone systems which utilize sequence switches in place of relays to perform the necessary circuit operations. The use of a sequence switch per se is not new in the telephone art but this invention was conceived to advance the art in the use of the sequence switch in telephone circuits. One circuit in which the sequence switch may be used to great advantage is the party line connector shown in detail in the disclosure of the inventive idea.

One object of this invention is to provide a telephone switch circuit which operates in response to a plurality of series of impulses in which there is a sequence switch movable into a plurality of positions and designed to perform various circuit functions in response to the movement into the various positions, the telephone switch circuit being designed so that the sequence switch will move into one certain position in response to one of said series of impulses regardless of the number of impulses in the series and will move into a different one of said positions in response to each impulse in the succeeding series of impulses.

Another object of the invention is to provide a connector circuit which operates in response to the receipt of a plurality of series of impulses to connect with called lines accessible from the connector circuit in which there is a stepping sequence switch designed to perform various circuit functions in response to the movement into the various positions, the connector circuit being designed so that the sequence switch will take one step in response to the receipt of the first of said series of impulses regardless of the number of impulses in the series, a second step in response to the receipt of the second of said series of impulses regardless of the number of impulses in the series, and a step in response to each impulse received in the remaining series of impulses.

Another object of this invention is to provide a party line connector circuit which operates in response to a plurality of series of impulses to connect with a called party line accessible to the connector circuit and to signal one of the subscribers on the party line in which there is a sequence switch designed to perform various circuit functions, the circuit being so constructed that the sequence switch will operate to transfer the pulsing circuit in the connector from the "tens" selection device to the "units" selection device and will also operate to select the ringing signal to be applied to the line and the side of the line to which the signal is to be applied.

Still another object of this invention is to provide in a two hundred point connector of the type described in the immediately preceding object that the sequence switch will also select the hundreds group in which the called party line is located.

Still another object of this invention is to provide a spark suppressor which is connected in the pulsing circuit so as to be common to the tens and units selecting device and also to the sequence switch.

Another object of this invention is to provide a party line connector circuit which operates in response to a plurality of series of impulses to connect with a called party line in which there is a sequence switch which operates once in response to a first series of impulses regardless of the number of impulses in the series to transfer the pulsing circuit of the connector from the "tens" selecting device to the "units" selecting device, then operates once in response to the second series of impulses regardless of the number of impulses in the series to transfer the pulsing circuit of the connector from the "units" selecting device to the sequence switch driving mechanism, and then operates once in response to each of the impulses in the remaining series of impulses to select the ringing signal to be applied to the line, and also to select the side of the line to which the signal is to be applied, and also to select the hundreds group in which the calling line is connected if the party line connector is a two hundred line connector.

The invention will appear more clearly, and further objects will become apparent, from the following detailed description when taken in connection with the accompanying drawings, showing by way of example, a preferred embodiment of the inventive idea.

Figures 1A, 2, 3:
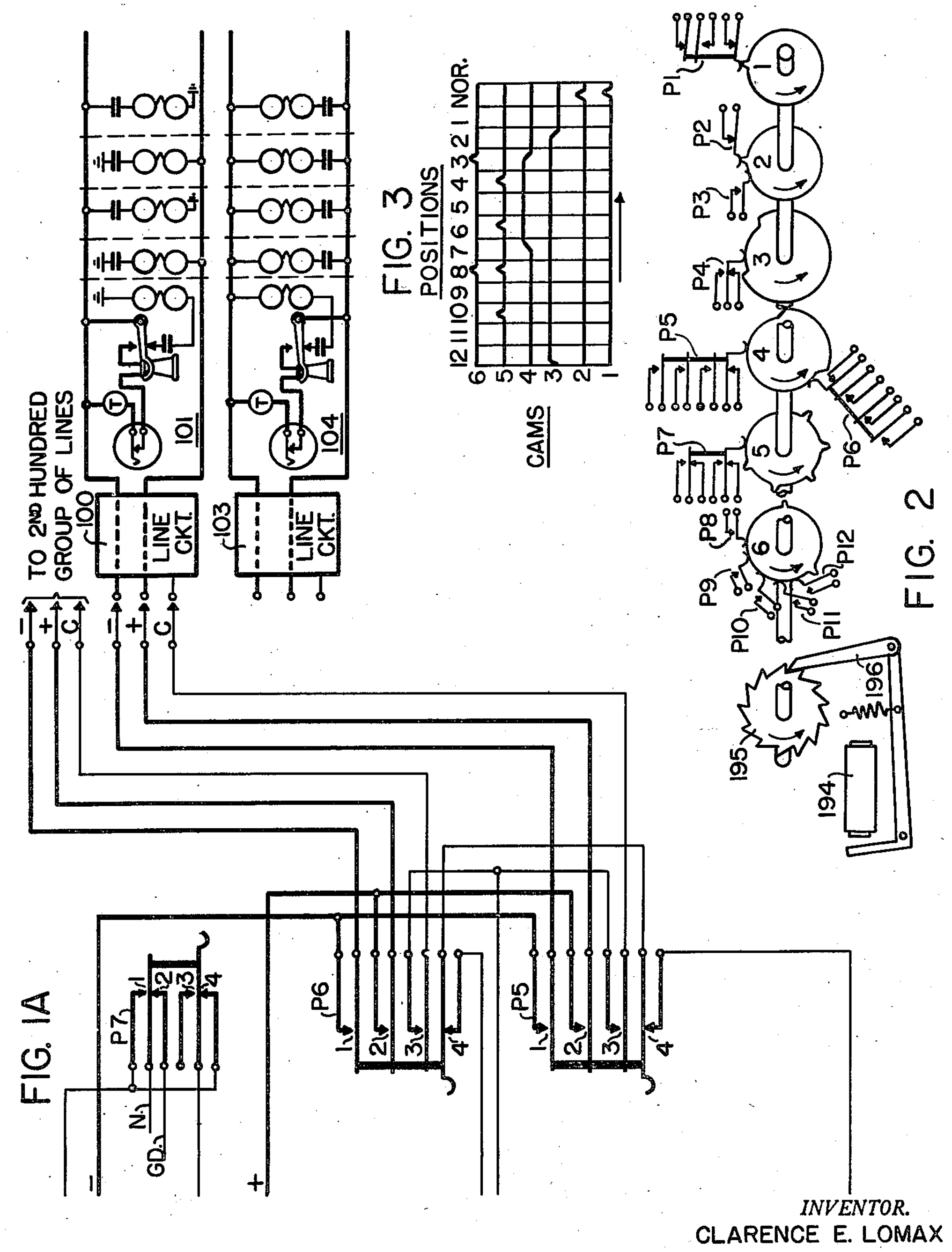

Figs. 1, 1A, 2 and 3, inclusive, depict a telephone system which best illustrates the present invention. More specifically, Figs. 1 and 1A show a connector circuit and associated switch train for enabling a subscriber such as at substation A to complete a connection to a party line such as lines 101 or 104, the connector circuit including spring pile-ups P1 to P12, inclusive, of the sequence switch shown in Fig. 2. The sequence switch of Fig. 2 includes an operating magnet 194, pawl 196, ratchet 195, and a plurality of cams and spring pile-ups. Fig 3 shows the cams in a graphical form.

Referring first to Fig. 2, the sequence switch shown therein is of the step-by-step pawl driven type, the cams 1 to 6, inclusive, which comprise the switch being fixedly secured on a common shaft to which there is also fixedly attached a ratchet 195 designed to cause the shaft and thus the cams to take thirteen steps to complete one revolution. The ratchet 195 is driven by a pawl 196 controlled by an electro-magnetic 194, the switch being of the reverse drive type, i. e. the switch will trigger itself on the operation of the magnet and will step on the release of the magnet. There are six cams in the sequence switch shown, the cams being labeled 1 to 6, inclusive, and associated with each cam is one or more spring pile-ups, each pile-up consisting of one or more sets of spring contacts. The spring pile-ups P1 to P12, inclusive, are associated with their respective cams in predetermined space relationships, the reason for which will become apparent. The sequence switch has a normal position which it assumes when the connector circuit is not in use, the switch in Fig. 2 being shown in its normal position. Besides the normal position, the switch has twelve other positions or steps thus making a total of thirteen. Certain ones of the spring pile-ups are operated in each position of the sequence switch and certain of the pile-ups are operated more than once in each revolution of the cam. For instance, the pile-ups P1 and P2 are operated and their contact sets open when the sequence switch is in the normal position; pile-up P3 will be operated by cam 2 on the first step of the sequence switch, at which time pile-up P2 will be restored; pile-up P7 will be operated and restored five times in one revolution, at the 4th, 6th, 8th, 10th and 12th positions or steps. It would be just as feasible to provide a greater number of cams so that the spring pile-up could be in alignment when the sequence switch is constructed, but six cams will adequately serve for the purpose of illustration.

The 200 line connector shown in Figs. 1 and 1A is arranged to operate with five-party party lines having either harmonic ringing or code ringing, the ringers being either divided or bridged on the party lines in a well-known manner. One of each such party line has been shown, line 101 being of the divided ringing type, and line 104 being of the bridged ringing type. The third digit dialed into the connector determines the hundreds groups the called line is in, the frequency or code to apply to the line depending upon the type of ringing used, and the side of the line to which the ringing signal is to be applied.

More particularly, if the third digit is composed of from one to five impulses, inclusive, the connector circuit will test and seize, if idle, a party line in the first hundred group of party lines while if the digit is composed of from six to ten impulses, inclusive, a party line in the second hundred group of lines will be tested and seized if idle. With each different impulse of the first five impulses in the third digit, a different frequency or code is selected and a particular one side of the line to which the ringing signal is to be connected over is also selected. On all odd digits in the third series of impulses, the ringing signal will be connected over the negative side of the line while on even digits the signal will be connected over the positive side.

This party line connector is accessible to subscriber A over the line circuit, finder and selector in a well known manner. This connector is marked idle on the banks of the battery-searching selectors by the presence of resistance battery on the C terminal of the selector banks by way of contacts 1 of spring pile-up P1 and contacts 144. This circuit is seized by the searching selector by closing a line loop over the — and + line leads to the two windings of relay 120 by way of contacts 112 and 114. Relay 120 operates and closes the circuit to relay 130 at contacts 121. Relay 130 operates, grounds the C lead at contacts 134 to mark this circuit busy in the selector banks and to hold the preceding switch train under control of this connector circuit, and prepares the pulsing circuit from the back contacts 122 of relay 120 to the vertical magnet 190 and relay 125. This circuit is now prepared to receive a first series of impulses transmitted from the subscriber's dial. Relay 120 follows the first series of impulses, closing and opening, at contacts 122, the pulsing circuit to the vertical magnet 190 and to slow operating relay 125 by way of contacts 133, contacts 4 of spring pile-ups P6 and P5, and contacts 136 and spring pile-up P2. Relay 130 is slow-to-release and will remain operated during impulsing. Relay 125 operates on the first impulse by way of contacts 122, 133, 4 of spring pile-ups P6 and P5, and 136 and remains operated for the remaining impulses of the first digit due to its slow-release characteristics. Relay 125 on operating closes the circuit to relay 140 at contacts 126. Relay 140 operates and closes the circuit to sequence switch magnet 194 at contacts 146 by way of contacts 2 of spring pile-up P4. The vertical magnet 190 responds to the first digit to step the Strowger switch wipers to the bank level corresponding to the first digit. On the first vertical step of the switch wipers, the V.O.N. springs operate to prepare a release circuit to be subsequently described.

The sequence switch magnet 194 operates and remains operated during the first series of impulses as does relay 140. The sequence switch is of the reverse drive type, i. e., it takes one step each time the sequence switch magnet releases after operation, and therefore the sequence switch does not step at this time.

At the termination of the first series of impulses, relay 120 remains steadily operated, the circuit to slow-release relay 125 being open at contacts 122. After a short delay, relay 125 releases, opening the circuit to relay 140 at contact 126. Relay 140 releases, opening the circuit to the sequence switch magnet 194 at contacts 146. Magnet 194 releases and the sequence switch steps from the normal position to the first position causing spring pile-ups P1 and P2 to release and spring pile-up P3 to operate. Release of pile-up P1 prepares several circuits to be subsequently explained and release of pile-up P2 opens the pulsing circuit to the vertical magnet 190. Operation of pile-up P3 closes the pulsing circuit to the rotary magnet 193. The connector is now prepared to receive a second series of impulses corresponding to a digit transmitted from the dial of subscriber A.

Relay 120 follows the second series of impulses received over the line loop and this circuit operates in the same manner as described for the first digit with the exception that the rotary magnet 193 is operated rather than the vertical magnet 190. Relays 125 and 140 are operated as is the sequence switch magnet 194. The rotary magnet steps the Strowger switch wipers to the bank contacts terminating the party lines designated by this second digit dialed into the connector. At this time, each set of wipers is standing on a set of bank contacts which terminate a party line, the lower set being connected with a line in the first hundreds group of party lines (either line 101 or line 104), and the upper set being connected with a line in the second hundreds group of party lines. Before the third digit is dialed, there is no way of telling which of the two party lines is desired and the line wipers are open at pile-ups P5 and P6. The control wipers C are also open at P5 and P6 so that any potential present on the "C" terminals passed over by the wipers during the rotary movement would have no effect on the connector.

After the termination of the second series of impulses, relay 120 remains steadily operated, holding the circuit to slow-release relay 125 open at contacts 122. Relay 125 releases and opens relay 140. Relay 140 releases, opening the circuit to the sequence switch magnet 194. Magnet 194 releases, stepping the sequence switch from position 1 to position 2. In position 2, spring pile-up P3 restores and pile-up P4 operates. Restoration of pile-up P3 opens the pulsing circuit to the rotary magnet 193. Operation of spring pile-up P4 transfers the control of the sequence switch magnet 194 from relay 140 by way of contacts 146 and 2 of pile-up P4 to the pulsing circuit by way of contacts 1 of pile-up P4. The circuit is now ready to receive the third and last digit, the digit which selects the proper hundreds group, the ringing code or frequency to be applied over the party line, and the side of the line to which the ringing will be applied. It should be noted that the well-known type spark suppressor made up of condenser C and resistor R is connected in the pulsing circuit so as to be used in common by the pulsing circuit in transmitting pulses to the vertical, rotary, and sequence switch magnets.

A brief summary of how the circuit functions in response to the third digit will now be given followed by a detailed description of calls to a party line in each of the hundreds group.

As noted, the sequence switch magnet 194 is now connected in the pulsing circuit and the sequence switch magnet will follow the third digit, causing the sequence switch to step once for each impulse received. The sequence switch is thus converted into a selecting switch. In response to the first impulse of the third digit, the sequence switch will step from position 2 to position 3, in response to the fifth impulse it will step from position 6 to position 7, etc. Spring pile-up P5 operates in response to the first impulse and remains operated thru the fifth impulse, connecting the party line in the first hundreds group of called lines thru to the connector. Spring pile-up P5 releases and pile-up P6 operates in response to the sixth impulse, pile-up P6 remaining operated for the sixth to tenth impulses. Pile-up P6 connects the party line in the second hundreds group of party lines thru to the connector. Spring pile-ups P8 to P12 operate and release successively in positions 3 to 7, respectively, in response to the first five impulses of the third digit and again in positions 8 to 12, respectively, in response to the last five impulses of the third digit. These spring pile-ups serve to connect the proper ringing frequency or ringing code to the called party line. Also on each even impulse of the third digit, spring pile-up P7 is operated while on each odd impulse P7 is released. The operation and release of pile-up P7 transfers the ringing circuit from one side of the party line to the other side to provide for divided ringing where such a ringing system is employed. It should be noted that the connector may be arranged for harmonic ringing or code ringing. The code or harmonic frequencies are connected to the circuit by way of Gen. 1 to Gen. 5 leads. A ringback signal is returned by way of Gen. 2 in one case or by way of relay 160 and all the Gen. leads in another case. The ringback circuit thru relay 160 is preferably used when code ringing is used so that the calling party will hear the code signal that is being sent over the called party line.

As an example, let us assume that the third digit dialed by the calling party is a 3. Relay 120 follows the dial impulses received over the calling line loop and in turn causes the pulses to be repeated to relay 125 and the sequence switch magnet 194 by way of contacts 122. Relay 125 operates on the first impulse of the third digit and remains steadily operated during impulsing due to its slow-release characteristics, the impulsing circuit being traceable from contacts 122, through contacts 133, contacts 4 of pile-up P6 and P5, and contacts 136. The sequence switch magnet 194 operates, by way of contacts 122, 133, 4 of pile-ups P6 and P5, and contacts 1 of pile-up P4, once for each impulse received, causing the sequence switch to take one step each time the magnet 194 releases. Relay 125, on operating for the first impulse, closes relay 140 which operates to connect relay 150 to each of the C wipers by way of contacts 141 and pile-ups P5 and P6. Relay 140 also closes a multiple pulsing circuit to relay 125 and the magnet 194 at contacts 145 to insure the continued pulsing of magnet 194 when the original operating circuit is opened at contacts 4 of pile-up P5.

In response to the first impulse of the third digit, the sequence switch steps from position 2 to position 3, pile-up P4 remaining operated and pile-up P5 and P8 operating in position 4. Pile-up P4 remains operated until the sequence switch returns to the normal position. Operation of P5 closes the − and + line leads to the party line 101 or 104 thru contacts 1 and 2, respectively, closes the C lead to the party line thru contact 3, and opens the original pulsing circuit to the sequence switch 194 at contacts 4. If the party line in the first hundreds group is idle, battery thru the CO relay (not shown) in the line circuit 100 or 103 on the C lead will prevent relay 150 from operating in a well-known manner and this circuit will remain as is until the end of the third digit. But if the party line is busy, ground will be standing on the C lead in the line circuit and relay 150 will operate immediately after pile-up P5 operates by way of contacts 141 and contacts 4 of pile-up P5. This operation of relay 150 occurs even if the party line in the second hundreds group is the one desired but the operation does not affect the circuit until after the termination of pulsing since the holding circuit of relay 150 is opened during pulsing by relay 140 at contacts 142 and since the dial mechanism at the calling station holds the receiver circuit open during dialing thus preventing the calling party from hearing the busy tone connected to the line at contacts 151. Pile-up P5 remains operated for the three pulses of the third digit. In response to the first impulse, with the sequence switch in position 3, pile-up P8 operates to close one of the generator circuits or code ringing circuits to the ringing circuit thru relay 160, the ringing circuit at this time being open at contacts 157. In response to the second impulse, pile-up P8 releases and pile-up P9 operates to close the second ringing signal thru relay 160. In response to the third impulse, which under the assumption is the last, pile-up P9 releases and pile-up P10 operates, closing the harmonic ringing frequency or code ring connected to the Gen. 3 lead to relay 160. Spring pile-up P7, which had operated on the second impulse, is released on the third impulse to prepare the incomplete circuit from the Gen. 3 to the — side of the party line by way of contacts 4 of P7. At the termination of the third impulse, relay 120 remains steadily operated, opening the circuit at contacts 122 to relay 125. Relay 125 releases, opening relay 140. Relay 140 releases. Assume that the called party line in the first hundreds group is busy. Relay 150 would have operated from ground on the C lead in the line circuit as previously explained. Release of relay 140 closes a holding circuit to relay 150 from the C lead by way of contacts 142 and 152 and then opens the original operating circuit to relay 150. This holding circuit is to insure that the busy condition of the connector will remain even if the party line subsequently becomes idle. Relay 150 closes busy tone by way of contacts 151 to the calling party over the line. The connector remains in this position until the calling party releases the connection.

When the calling party releases after receiving the busy signal, the line loop is opened and relay 120 releases, opening relay 130. Relay 130 releases, removing ground from the C lead at contacts 134 to release the preceding switch train, closing an alarm circuit by way of contacts 188, 135, and contacts 2 of P1 to cause a delayed alarm in case the sequence switch should fail to return to normal, opening the holding circuit to relay 150 at contacts 131, and closing the circuit to the Strowger switch release magnet 127 by way of contacts 122, 132, 134 and 192 of the V. O. N. springs. Although ground is removed from the C terminal in the selector banks, this connector remains busy to searching selectors because the circuit to the resistance battery is held open at contacts 1 of P1. Relay 150 releases. The release magnet operates to return the Strowger switch to normal. In the normal position, the V. O. N. springs restore, opening contacts 192 and closing contacts 191. A homing circuit is closed to the sequence switch magnet 194 by way of contacts 122, 132, 184, 191, 3 of pile-up P1, and 197 of magnet 194. The sequence switch automatically operates in this self-interrupting circuit to step to the normal position. In the normal position, pile-up P1 operates to open the self-interrupting circuit to stop the stepping, opens the alarm circuit at contacts 2, and closes the resistance battery to the C terminal in the selector banks by way of contacts 1 of P1 to mark this circuit as idle to searching selectors. The connector is now at normal.

If the called line in the first hundred groups is idle, relay 150 is not operated and when relay 140 releases after impulsing it closes a circuit at contacts 143 from ground thru contacts 131, 153, lower winding relay 180 and contacts 3 to P5 to the battery connected C. O. relay (not shown) on the C lead in the line circuit. Relay 180 operates, closes its X contacts 183 first to lock itself up thru its upper winding to ground at contacts 131 and then grounds the C lead to the line circuit to hold the cut-off relay operated and to mark the line circuit as busy to other connectors, closes the pick up lead P. U. to relay 155 by way of contacts 186, and closes a part of the talking circuit at contacts 181 and 182. At the beginning of the next cycle of the ringing machine in the exchange, the P. U. lead is momentarily grounded to operate relay 155. Relay 155 locks itself up by way of contacts 159, 177 and 187. Relay 155 closes the ringing signal on the Gen. 3 lead thru slow-operate relay 160 to the — side of the line by way of contacts 157, 4 of P7, 171 and 181, and also closes a ringback signal to the calling party by way of contacts 156. If code signals and bridged ringing is used, all the ringers on the line will ring the code. If code signals and divided ringing is used, all the ringers on the — side of the line will ring the code. If frequency ringing is used, only the proper harmonic ringer will ring. Such systems of ringing are well known in the telephone art.

When the call is answered by a party on the party line, the line loop is closed thru the answering telephone circuit and relay 160 operates from the battery connected to the generator by way of P10, contacts 157, 4 of P7, 171, 181, 1 of P5, the line loop, contacts 2 of P5, 182, 173, and 3 of P7 to ground. Relay 160 operates and closes relay 170 at contacts 161. Relay 170 operates, closes its holding circuit thru the lower winding of relay 180 by way of contacts 176, 143, 153 and 131, opens relay 155, opens the P. U. lead, switches the line leads thru to the called line at contacts 172 and 174, and prepares the SUPY. lead at contacts 175. Relay 110 operates over the called line loop in a well-known manner and reverses the battery thru relay 120 on the calling line leads to give a supervisory signal for metering, etc. Relay 110 also connects ground to the windings of relay 180 at contacts 115 to hold this circuit under control of the called party. Relay 155 releases to open the ringing circuit at contacts 157 and also to open the ringback signal at contacts 156.

If the calling party releases first, relay 120 releases and in turn releases relay 130. Release of relay 130 closes ground to the SUPY. lead by way of contacts 122, 132, 185 and 175 to give a signal indicating that the calling party has released but that the called party is holding this connector circuit. Release of relay 130 removed ground from the C lead at contacts 134 to release the preceding switch train. The connector is retained marked as busy in the selector bank since the circuit to the resistance battery is open at contacts 1 of P1. When the called party then releases, relay 110 releases and opens the circuit to relays 180 and 170 at contacts 115. Relay 170 releases and opens the SUPY. lead to extinguish the alarm. Relay 180 releases, removes ground from the C wiper at contacts 187 to release the line circuit 100 or 103, and closes ground thru contacts 122, 132, 184, and 192 to the Strowger switch release magnet 127. The release magnet 127 operates to return the Strowger switch to normal. In the normal position, the V. O. N. springs release and at contacts 192 open the release magnet 127 and at contacts 191 close the above traced ground circuit thru contacts 3 of P1 and self-interrupting contacts 197 to the sequence switch magnet 194. The sequence switch automatically operates in a self-interrupting manner to return to its normal position. In the normal position, spring pile-up P1 operates to open the self-interrupting circuit to the sequence switch to stop the same, and to close resistance battery thru contacts 1 to the C lead to mark this circuit idle in the selector banks.

If the called party had released first, release of the Strowger switch and the sequence switch when the calling party released would take place in a manner similar to that previously explained and will be apparent to one skilled in the art from a brief study of the circuit.

Now let us assume that the third digit dialed by the calling subscriber is nine. This indicates that the call is for the party line in the second hundreds group, that the ringing code or frequency will be that connected to the Gen. 4 lead and that the ringing generator battery will be connected to the negative side of the called line. The sequence switch follows the third series of impulses as previously described, in this instance taking nine steps in response to the nine impulses, the ninth step taking the switch to position 11. As the sequence switch passed from position 7 to 8, spring pile-up P5 released and pile-up P6 operated, thus selecting the wiper set standing on the party line in the second hundreds group of lines. If relay 150 had been operated due to a busy condition on the party line in the first hundreds group of lines, it will release when spring pile-up P5 releases and will then re-operate or remain released depending on the condition of the party line in the second hundreds group of lines. The remaining circuit functions are similar to those described previously for completing a call to the party line in the first hundreds group and will not be described.

It should be noted that this invention is not limited to party line connectors or the connectors in general but will apply equally well to telephone circuits which are required to function analogously. Numerous uses and adaptations of the invention will occur to those versed in the art and all changes and modifications coming within the scope of the appended claims are embraced thereby.

What is claimed is:

1. In a telephone system, a connector circuit for connecting with party line bank outlets comprising a primary stepping mechanism responsive to a first series of impulses for causing said connector to step in a primary direction, a secondary stepping mechanism responsive to a second series of impulses for causing said connector to step in a secondary direction, a pulsing circuit for transmitting impulses connected to said primary stepping mechanism, and a plurality of signal sources for providing the various ringing signals, a sequence switch mechanism, means for operating said sequence switch once after each said first and second series of impulses, first circuit means for disconnecting said pulsing circuit from said primary stepping mechanism and for connecting said pulsing circuit to said secondary stepping mechanism, means included in said sequence switch mechanism for operating said first circuit means on operation of said sequence switch mechanism after transmission of said first series of impulses, second circuit means for disconnecting said pulsing circuit from said secondary stepping mechanism and for connecting said pulsing circuit to said sequence switch mechanism, second means included in said sequence switch mechanism for operating said second circuit means on operation of said sequence switch mechanism after transmission of said second series of impulses, and means operated by said sequence switch mechanism responsive to a third series of impulses transmitted over said pulsing circuit for selecting one of said signal sources dependent on the number of impulses in said third series.

2. In a telephone system as claimed in claim 1, a pair of wiper sets in said connector circuit for connecting with a pair of party line bank outlets in response to the vertical and rotary stepping of the connector, a pair of means each operative to select a certain one of said pair of wiper sets, and means operated by said sequence switch mechanism responsive to said third series of impulses for operating one or the other of said pair of means dependent on the number of impulses in said third series.

3. In a telephone system as claimed in claim 1, third circuit means for disabling said pulsing circuit, and means operated by said sequence switch mechanism responsive to said third series of impulses for operating said third circuit means.

4. In a telephone system, a 200-line connector for use with party lines having divided ringing comprising a first selecting device, including a driving means a second selecting device including a driving means and a pulsing circuit for transmitting impulses, a third selecting device including a driving means, a first circuit means connecting said pulsing circuit to said first selecting device driving means, a second circuit means for connecting said pulsing circuit to said second selecting device driving means, a third circuit means for connecting said pulsing circuit to said third selecting device driving means, means included in said third selecting device for controlling said first, second and third circuit means, means associated with and controlled by said pulsing circuit for operating said third selecting device after transmission of a first series of impulses thereover to thereby disable said first circuit means and operate said second circuit means and for again operating said third selecting device after transmission of a second series of impulses thereover to thereby disable said second circuit means and operate said third circuit means, a fourth circuit means for selecting one of the two hundreds groups of lines, a fifth circuit means for selecting a proper ringing signal, a sixth circuit means for selecting one of the sides of the party line to which the selected ringing signal is to be connected, and means included in said third selecting device for operating said fourth, fifth and sixth circuit means in response to a third series of impulses.

5. In a telephone system, a switch arranged to select among groups of outlets in response to a plurality of impulses, a pulsing circuit for transmitting impulses, a first driving means in said switch connected to said pulsing circuit and operated in response to a first series of impulses transmitted thereover to cause said switch to make a first group selection, an impulse responsive device, circuit means associated with said pulsing circuit for operating said impulse responsive device after transmission of said first and a second series of impulses, a second driving means in said switch, means operated under control of said impulse responsive device responsive to operation thereof after transmission of said first series of impulses for transferring said pulsing circuit from said first driving device to said second driving device, said second driving device operated in response to a second series of impulses transmitted over said pulsing circuit to cause said switch to make a second group selection, means operated by said impulse responsive means after transmission of said second series of impulses for transferring said pulsing circuit from said second driving device to said impulse responsive device, said impulse responsive device operated in response to a third series of impulses transmitted over said pulsing circuit to make further selections, circuit means for disabling said pulsing circuit, and means controlled by said impulse responsive device for operating said circuit means.

CLARENCE E. LOMAX.

REFERENCES CITED

The following references are of record in the file of this patent:

UNITED STATES PATENTS

| Number | Name | Date |
|---|---|---|
| 1,512,584 | Dunham | Oct. 21, 1924 |
| 1,604,550 | Deakin | Oct. 26, 1926 |
| 1,655,061 | Jordan | Jan. 3, 1928 |
| 2,179,826 | May | Nov. 14, 1939 |
| 2,515,783 | Lomax | July 18, 1950 |